United States Patent [19]
Helbig et al.

[11] Patent Number: 4,964,424
[45] Date of Patent: Oct. 23, 1990

[54] PNEUMATIC VALVE ASSEMBLY FOR CONTROLLING A STREAM OF COMPRESSED AIR

[75] Inventors: Roland Helbig, Trossingen; Karl Trittler, Aldingen, both of Fed. Rep. of Germany

[73] Assignee: Hengstler GmbH, Aldingen, Fed. Rep. of Germany

[21] Appl. No.: 335,756

[22] Filed: Apr. 10, 1989

[30] Foreign Application Priority Data

Apr. 16, 1988 [DE] Fed. Rep. of Germany ....... 3812769

[51] Int. Cl.$^5$ ............................................ F15B 13/042
[52] U.S. Cl. ...................................... 137/557; 91/403; 137/625.6; 251/65
[58] Field of Search ............... 91/403; 137/557, 625.6; 251/65

[56] References Cited

U.S. PATENT DOCUMENTS

| | | | |
|---|---|---|---|
| 2,575,086 | 11/1951 | Atchison | 251/65 |
| 3,398,764 | 8/1968 | Herion | 137/625.64 X |
| 3,517,699 | 6/1970 | Marcum | 251/65 X |
| 4,137,942 | 2/1979 | Hargraves et al. | 137/557 |
| 4,630,645 | 12/1986 | Spa | 137/625.6 |

FOREIGN PATENT DOCUMENTS 143295 8/1980 Fed. Rep. of Germany ........ 251/65

Primary Examiner—Gerald A. Michalsky
Attorney, Agent, or Firm—Balogh, Osann, Kramer, Dvorak, Genova & Traub

[57] ABSTRACT

This invention relates to a pneumatic valve assembly for controlling a compressed air stream in response to a non-contacting actuation. It is desired to provide such a valve assembly which is adapted to control high working pressures without an intermediate amplifier. This is accomplished in that a pivoted one-armed or double-armed lever is provided with a permanent magnet on one side or on each of both sides of its pivotal axis and via a ferromagnetic or magnetic actuating member which is moved into the proximity of the permanent magnet or magnets and via a plunger causes a pilot orifice to be opened or closed, which orifice is adapted to be flown through by a pilot air stream for actuating a pilot piston for moving a valve piston to positions in which the valve is opened or closed.

16 Claims, 3 Drawing Sheets

PNEUMATIC VALVE ASSEMBLY FOR CONTROLLING A STREAM OF COMPRESSED AIR

BACKGROUND OF THE INVENTION

1. Field of the Invention

This invention relates to a pneumatic valve assembly for controlling a stream of compressed air in response to a non-contacting actuation.

2. Description of the Prior Art

In pneumatic systems in which a signal is to be derived from a working piston it is known to accommodate said piston in a preferably stationary cylinder, which consists of non-magnetic material, and to provide the piston with a permanent magnet. By such an arrangement, by which reed relays and other sensors which are responsive to a magnetic field can be controlled, mechanical problems encountered in other pneumatic valves are alleviated. If such an arrangement is used to control a pneumatic main valve which controls pressures in the range from 1 to 8 bars, a magnetically actuated pneumatic signal generator must be provided for the control of the pneumatic main valve. Such an arrangement involves the disadvantage that a separate supply of compressed air under a pressure of less than 0.25 bar is required for the sensor and said air must have a high purity because otherwise the small orifices may easily be clogged under the low pressures applied. Besides, the known pneumatic sensors are susceptible to shock and continuously consume air at a rate of about 2 liters per minute.

SUMMARY OF THE INVENTION

It is an object of the invention to provide a pneumatic valve assembly which is suitable for non-contacting actuation and is adapted to control high working pressures without a need for an interposed amplifier.

In a pneumatic valve assembly which is of the kind described first hereinbefore that object is accomplished in accordance with the invention in that a pivoted one armed or double-armed lever is provided with a permanent magnet on one side or on each of both sides of its pivotal axis and via a ferromagnetic or magnetic actuating member which is moved into the proximity of the permanent magnet or magnets and via a plunger causes a pilot orifice to be opened or closed, which orifice is adapted to be flown through by a pilot air stream for actuating a pilot piston for moving a valve piston to positions in which the valve is opened or closed. In such valve, the non-contacting sensor function, the amplifier function and the main valve as well as function-indicating means are combined in a single subassembly and a supply of additional pilot air is not required.

If permanent magnets are provided on the lever on both sides of its pivotal axis, said permanent magnets will preferably be interconnected by a magnetic yoke and will be oppositely poled so that a magnet which is movable into the proximity of both permanent magnets outside the valve body will constitute an actuating member which attracts one permanent magnet on the double-armed lever and repells the other of said permanent magnets. The actuating magnet may consist of a piston that is movable in an antimagnetic cylinder.

BRIEF DESCRIPTION OF THE DRAWING

FIG. 4-A shows a pneumatic cylinder with piston and installed switching magnet in section.

FIG. 4-B shows the pneumatic cylinder with piston and switching magnet of FIG. 4-A in connection with the double lever for the valve control.

FIG. 5-A shows a pneumatic cylinder with piston and installed switching magnet in section.

FIG. 5-B shows the pneumatic cylinder with piston and switching magnet of FIG. 5-A with a simple lever for the valve control.

DETAILED DESCRIPTION OF THE PREFERRED EMBODIMENT

Figure 1:
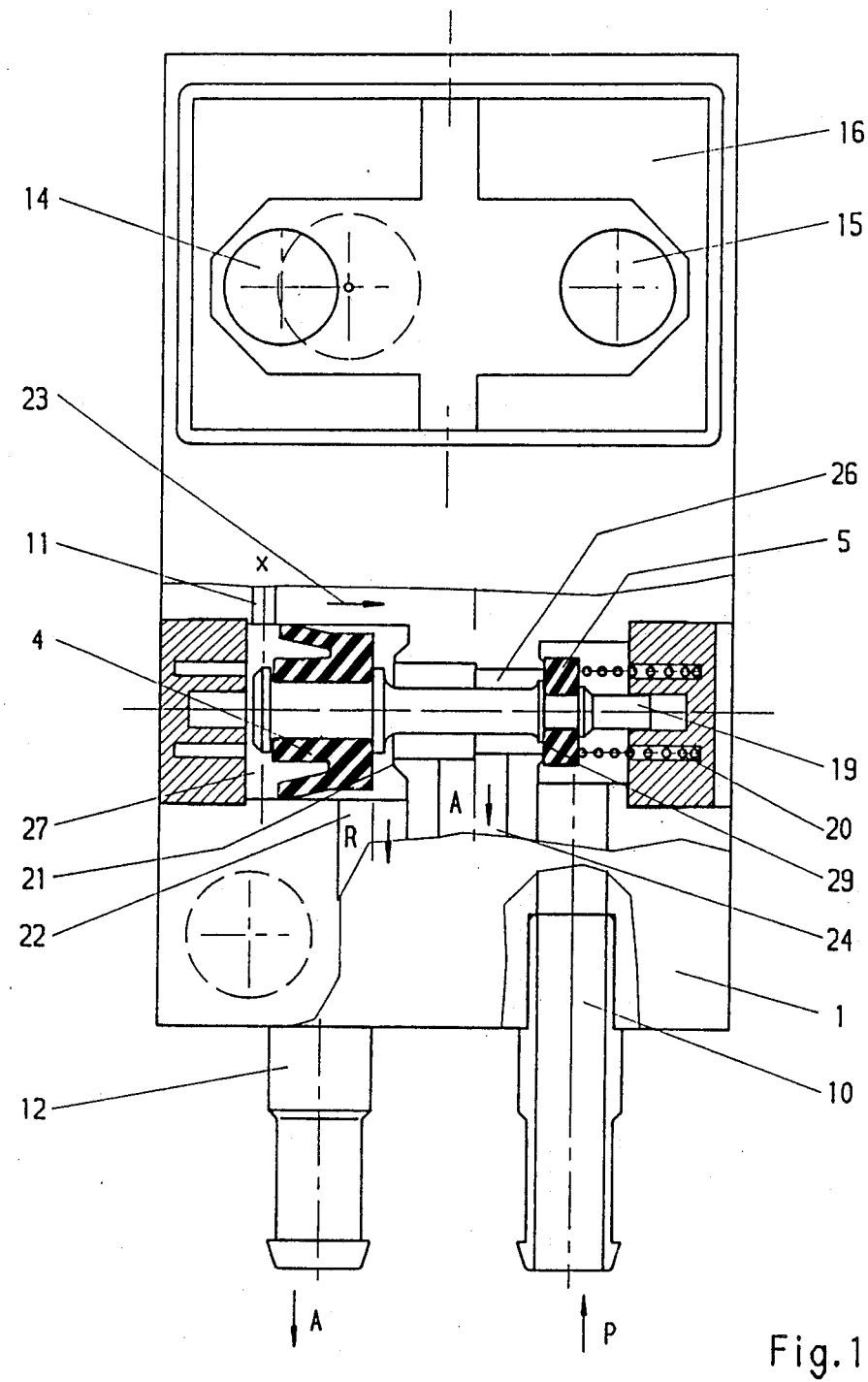
FIG. 1 is a top plan view showing the entire valve assembly with the main valve shown in section.

A preferred embodiment of the valve assembly in accordance with the invention is shown by way of example on the drawing and will be described more in detail hereinafter.

As is apparent from the drawing, housing means constituted by a valve body 1 contain a pilot orifice 2, a double-armed lever 3 for controlling the orifice 2, valve piston means comprising a pilot piston 4 and a valve piston 5, and function-indicating means 6.

When the plunger 7 has been lifted from the orifice 2, the latter will be supplied with a pilot air stream via a branch line 9 from the main line 10. When the orifice 2 is open, the air will flow through the orifice 2 and through the communicating passage 11 to the pilot piston 4 for actuating the valve piston 5 so that compressed air can flow from the supply line 10 through the valve passage in the valve body 1 to the tubular outlet port 12.

The pilot orifice 2 is controlled by the double-armed lever 3, which is provided on each of its lever arms extending on opposite sides of its pivotal axis with a permanent magnet 14 or 15, respectively. An actuating magnet 17 is movable into the proximity of the sensor surface 16 and is adapted to impart via said permanent magnets 14 and 15 to the double-armed lever 3 a pivotal movement by which the plunger 7 is moved to open and close the pilot orifice 2. Instead of two magnets 14 and 15, the lever 3 may be provided with a single magnet and in that case may consist of a one-armed lever. In that case the lever 3 may be moved in an opening sense by means of the actuating magnet 17 and in closing sense by a tension spring 31 or 32 which biases the lever 3.

In the present embodiment the two permanent magnets 14 and 15 disposed on opposite sides of the pivotal axis 13 of the lever 3 are interconnected by a magnetic yoke 18 are mutually oppositely poled.

The magnet 17 may consist, e.g., of a piston that is movable in an antimagnetic cylinder and constitutes an actuating member, which is disposed outside the valve body 1 and is operable to open or close the pilot orifice 2. When the orifice is open, a pilot air stream will be supplied via the communicating passage 11 to the pilot piston 4, which has at one end of the valve piston means 4, 5 a first piston surface, which is larger than a second piston surface, which is formed on the valve piston 5 at the opposite end of the valve piston means 4, 5. The valve piston 5 is connected to the pilot piston 4 by a rod 19, which is surrounded by a cylinder chamber 26. Under the action of the pilot air stream from the orifice 2 on the pilot piston 4, the valve piston 5 can be moved to an open position against the force of the spring 20 to permit compressed air P to flow from the supply line 10 through the cylinder chamber 26 to the tubular outlet port 12, from which said compressed air is then available as working air A.

The function-indicating means 6 are constituted by a piston 23, which is supplied with compressed working air A via line 24 and is thus extended against the force of the spring 25 to indicate the functional state of the valve.

Figure 2:
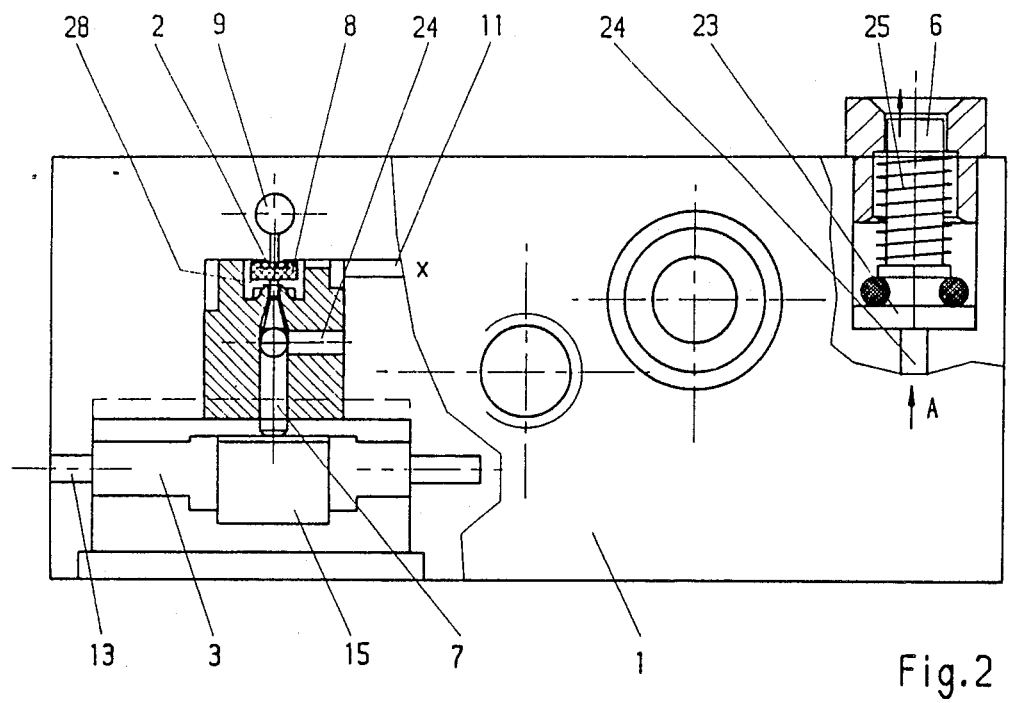
FIG. 2 is a side elevation with the control orifice provided with a control lever and function-indicating means shown in section.
Figure 3:
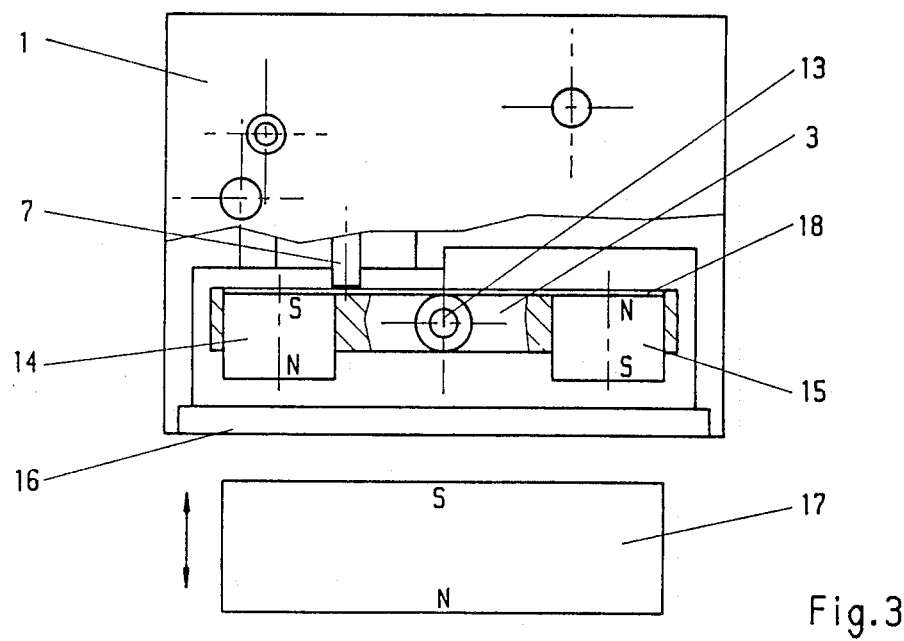
FIG. 3 is a rear elevation with the control lever and the switching magnet shown in section.

The valve assembly is shown in FIGS. 1 to 3 in position of rest, in which the cylinder chamber 26 is vented into the open via the venting passage 22. The cylinder chamber 27 is vented via the communicating passage 11 past the seal 8 and through the opening 24 into the atmosphere.

When the valve assembly has been actuated to move to its open position, not shown, the venting passage extending from the cylinder chamber 27 is closed by the seal 8 in contact with the collar 28 and the pilot piston 4 moving in the direction indicated by the arrow 23 is in contact with the annular surface 21 to prevent a venting of the cylinder chambe r 26 via the passage 22. Now the air stream 9 can flow past the valve seat 29 and through the passage 24 and leave the tubular outlet port 12 as working air A.

We claim:

1. In a pneumatic valve assembly for controlling a compressed air stream in response to a non-contacting actuation, which assembly comprises
    a housing means formed with a valve passage for conducting said compressed air stream through said housing means and
    a valve piston which is movably mounted in said housing means and operable to open and close said valve passage,
    the improvement residing in that said valve assembly further comprises
    a pilot orifice provided in said housing means,
    orifice control means for opening and closing said orifice,
    a lever, which is pivoted to said housing means and carries permanent magnet means, which are adapted to impart to said lever a pivotal movement for actuating said orifice control means in response to a movement of a magnetic actuating member into the proximity of said permanent magnet means, and
    means for supplying said orifice with a pilot air stream for operating said valve piston when said orifice is open.

2. The improvement set forth in claim 1, wherein said lever is a one-armed lever and
    said permanent magnet means consist of a single permanent magnet.

3. The improvement set forth in claim 1, wherein said valve piston means are arranged to open said valve passage in response to said pilot air stream flowing through said orifice.

4. The improvement set forth in claim 1, wherein said valve piston means are arranged to close said passage in response to said pilot air stream flowing through said orifice.

5. The improvement set forth in claim 1, wherein said valve piston means are biased by spring means opposing the action of said pilot air stream on said valve piston means.

6. The improvement set forth in claim 1, wherein said lever comprises two lever arms extending on opposite sides of a pivotal axis and
    said permanent magnet means comprise two permanent magnets carried by respective ones of said lever arms.

7. The improvement set forth in claim 6, wherein said two permanent magnets are oppositely poled and are interconnected by a magnetic yoke whereby one of said permanent magnets will be attracted and the other repelled by a magnetic actuating member which is in proximity to both said permanent magnets.

8. The improvement set forth in claim 7, wherein said assembly comprises an antimagnetic cylinder and an actuating piston which constitutes said magnetic actuating member and is movable in said cylinder into the proximity of both said permanent magnets.

9. The improvement set forth in claim 7, wherein said valve piston means are biased by spring means opposing the action of said pilot air stream on said valve piston means.

10. The improvement set forth in claim 1, wherein
    said valve piston means have at one end a relatively large first piston surface and at the other end a relatively small second piston surface,
    means are provided for supplying said pilot air stream to said first piston surface,
    means are provided to supply said second piston surface with said compressed air stream to bias said valve piston means against the action of said pilot air stream.

11. The improvement set forth in claim 1, wherein
    said valve piston means comprise a pilot piston formed with a first piston surface, at one end of said valve piston means, a valve piston formed with a second piston surface at the other end of said valve piston means, and a rod interconnecting said pilot and valve pistons.

12. The improvement set forth in claim 11, wherein
    said housing means define a cylinder chamber surrounding said rod and a venting passage,
    pilot piston is arranged to shut off said venting passage from said cylinder chamber when said valve piston opens said valve passage and
    said pilot piston is arranged to open said venting passage to said cylinder chamber when said valve piston closes said valve passage.

13. The improvement set forth in claim 12, wherein said cylinder chamber is included in said valve passage.

14. The improvement set forth in claim 1, wherein means are provided for supplying said orifice with a pilot air stream which has been branched from said valve passage.

15. The improvement set forth in claim 1, wherein said housing means are constituted by a common valve body.

16. The improvement set forth in claim 1, wherein a function-indicating piston is mounted in said housing means and is arranged to be extended out of said against a spring bias in response to the pressure of said compressed air stream in said valve passage downstream of said valve piston means.

* * * * *